Oct. 7, 1941.  W. B. PAYNE  2,257,843
SHEET FEEDING MECHANISM
Filed Sept. 6, 1940  7 Sheets-Sheet 4

INVENTOR.
Walter B. Payne
BY Raymond L. Bohrer
his ATTORNEY.

Oct. 7, 1941.    W. B. PAYNE    2,257,843
SHEET FEEDING MECHANISM
Filed Sept. 6, 1940    7 Sheets-Sheet 5

INVENTOR.
Walter B. Payne
BY
Raymond L. Bohrer
his ATTORNEY.

Oct. 7, 1941.  W. B. PAYNE  2,257,843
SHEET FEEDING MECHANISM
Filed Sept. 6, 1940   7 Sheets-Sheet 6

INVENTOR.
Walter B. Payne
BY Raymond E. Bohrer
his ATTORNEY.

Oct. 7, 1941.  W. B. PAYNE  2,257,843
SHEET FEEDING MECHANISM
Filed Sept. 6, 1940  7 Sheets-Sheet 7

INVENTOR.
Walter B. Payne
BY Raymond L. Ashew
his ATTORNEY.

Patented Oct. 7, 1941

2,257,843

UNITED STATES PATENT OFFICE 2,257,843

SHEET FEEDING MECHANISM

Walter B. Payne, Rochester, N. Y., assignor to The Todd Company, Inc., Rochester, N. Y., a corporation of New York Application September 6, 1940, Serial No. 355,661

22 Claims. (Cl. 271—41)

This invention pertains generally to an improved mechanism for feeding sheets of paper or other articles from a supply stack and advancing the sheets selectively through the mechanism at predetermined intervals or feeding the sheets to an associated machine or device in timed sequence, and is an improvement over the sheet feeding mechanism disclosed in the co-pending application of Gilbert L. Pierce, Serial No. 279,141, filed June 14, 1939, which has matured into Patent No. 2,214,752.

While various forms of friction feed devices have heretofore been employed with printing, cutting, or other machines adapted to perform operation on sheets and the like, such devices are not suitable for modern high speed operations. Many of the present high speed feeding devices are not adapted to feed sheets of different lengths at all, or at least without preparatory adjustment or loss of time during each cycle of operation. It is necessary for a rapid and flexible feeder that the material to be operated upon be positively positioned at a feeding point and then picked or fed from the stack at intervals dependent upon the length of the sheet, or in synchronism with an associated machine or device.

As herein disclosed, the present invention includes a friction feed mechanism having feed means to initiate the feed of a sheet from a stack to a feeding point where it is retarded in its path of movement until an auxiliary feed means or roller is selectively actuated to pick or separate the adjacent sheet from the stack and advance it in a predetermined direction. Such feeding device is preferably provided with a continuously rotating sheet feeding or positioning means and an intermittently actuated auxiliary feed means to initiate the advance of the sheet through the feeding mechanism. By this mechanism the diameter of the feed rollers or cylinders, or the circumferential movement of the feed parts are not dependent upon the length of the sheet to be fed, nor is it necessary to feed a sheet upon each revolution of the feed members, as in the case of devices wherein the feed parts are mounted in association with one another to move or rotate as a unit during each revolution thereof. With the latter type of feeder the roller or cylinder diameter governs the length of the sheet that may be fed so that the range of the device is extremely limited. However, with my improved mechanism the sheets of the stack adjacent the feed means are first shifted relative to the stack in position preparatory to actual advancement through the feed mechanism. Selectively or at a predetermined interval an intermittent feed means is actuated to initiate the advance of a sheet through the feed mechanism. Due to the intermittent action of the auxiliary feed member or means, a sheet of any reasonable length as well as a relatively short sheet may be accurately and rapidly fed by the mechanism. This arrangement further provides that the advancement of a sheet from the stack may be synchronized with the operation of an associated imprinting or other machine.

The object of the invention is to improve the construction as well as the means and mode of operation of a sheet feeding mechanism whereby it may not be only economically manufactured, but will be more flexible and efficient in use, positive in action, afford a wider variation in the length of sheets fed thereby, as well as the selective advance of a sheet through the mechanism.

Another object resides in the provision of a mechanism having a simple, compact, and convenient construction and arrangement of parts, with parts accessible for convenient adjustment or replacement in use.

A further object resides in the provision of a mechanism of the character capable of initially advancing a sheet to feeding position and retaining the sheet so positioned until an auxiliary feed means is rendered operative to advance the sheet in a predetermined direction through the mechanism.

A still further object resides in the provision of a sheet feeding mechanism having a caliper device adapted to operate a sheet diverter capable of by-passing two or more sheets if advanced at one time by the feeding mechanism.

Still another object resides in the provision of a self-contained unit capable of association with imprinting, slitting, recording, writing, or other machines adapted to operate upon sheets fed to operating position therein, and embodying intermittent feed means which is governed by the operation of the imprinting or other machine to feed a sheet from a stack in timed sequence with such machine.

To these and other ends the invention resides in certain improvements and combinations of parts, all as will be hereinafter more fully described, the novel features being pointed out in the claims at the end of the specification.

In the drawings:

Fig. 9 is a fragmentary sectional view taken substantially on the line 9—9 of Fig. 2, illustrating one of the means for adjusting and setting the sheet calipering mechanism.

The same reference numerals throughout the several views indicate the same parts.

Figure 1:
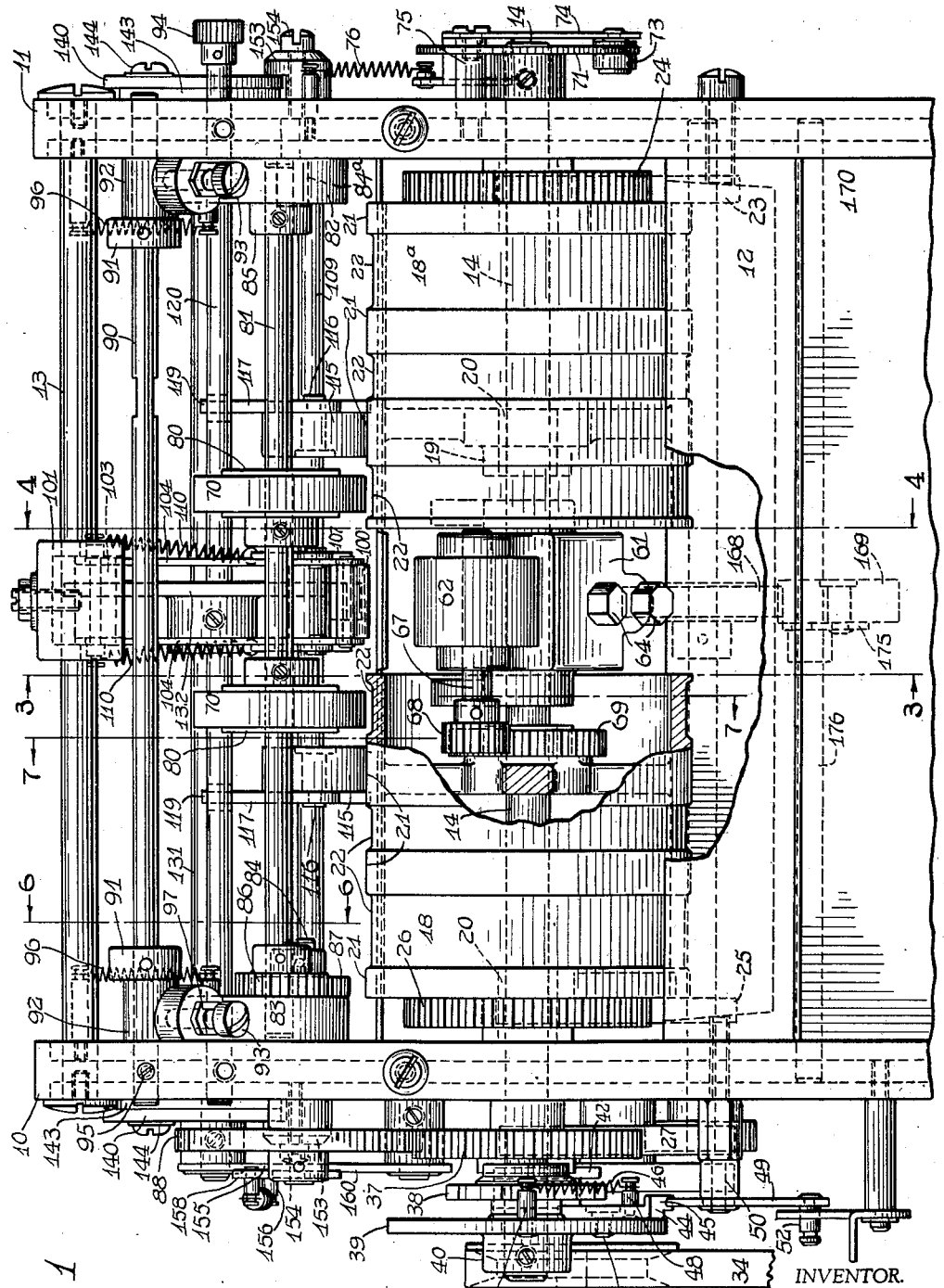
Fig. 1 is a front elevational view of a sheet feeding mechanism formed in accordance with the present invention, and which is illustrated with the cover plates of the device removed to disclose the operating mechanisms.
Figure 3:
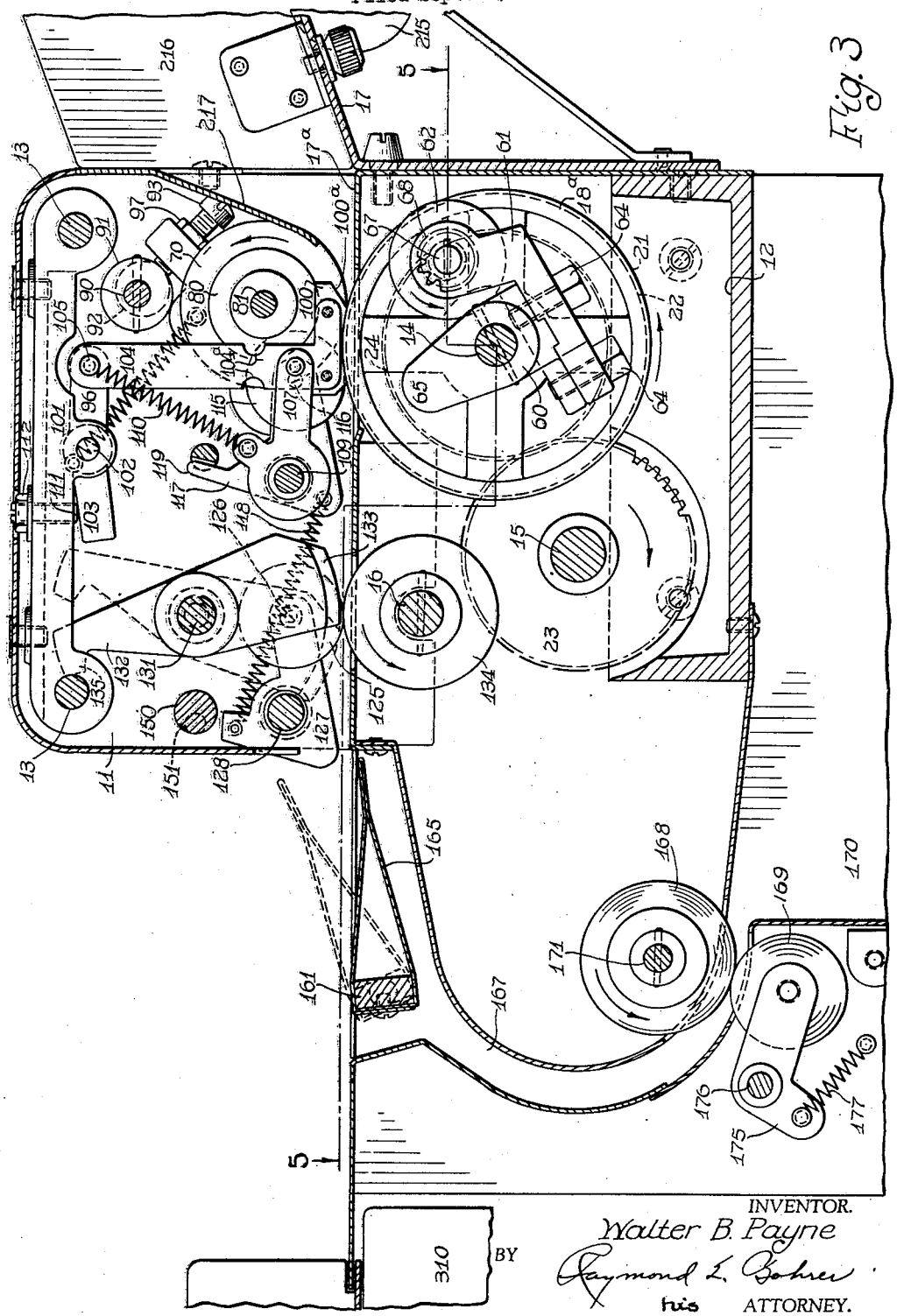
Fig. 3 is a vertical sectional view taken on the line 3—3 of Fig. 1 showing the auxiliary feed roller means in the position assumed between feeding operations.

Referring now to the drawings, the reference numerals 10 and 11 generally designate supporting side frames which are preferably in the nature of separate castings. These side frames are connected at the bottom by the channel member 12 and at the top by the cross rods 13, as best shown in Figs. 1 and 3. Registering openings are formed in the side frames for the cross shafts 14, 15, and 16. A receiving tray or supply hopper generally indicated at 17 is suitably secured to the side frames and adapted to receive a stack of sheets to be fed.

Figure 5:
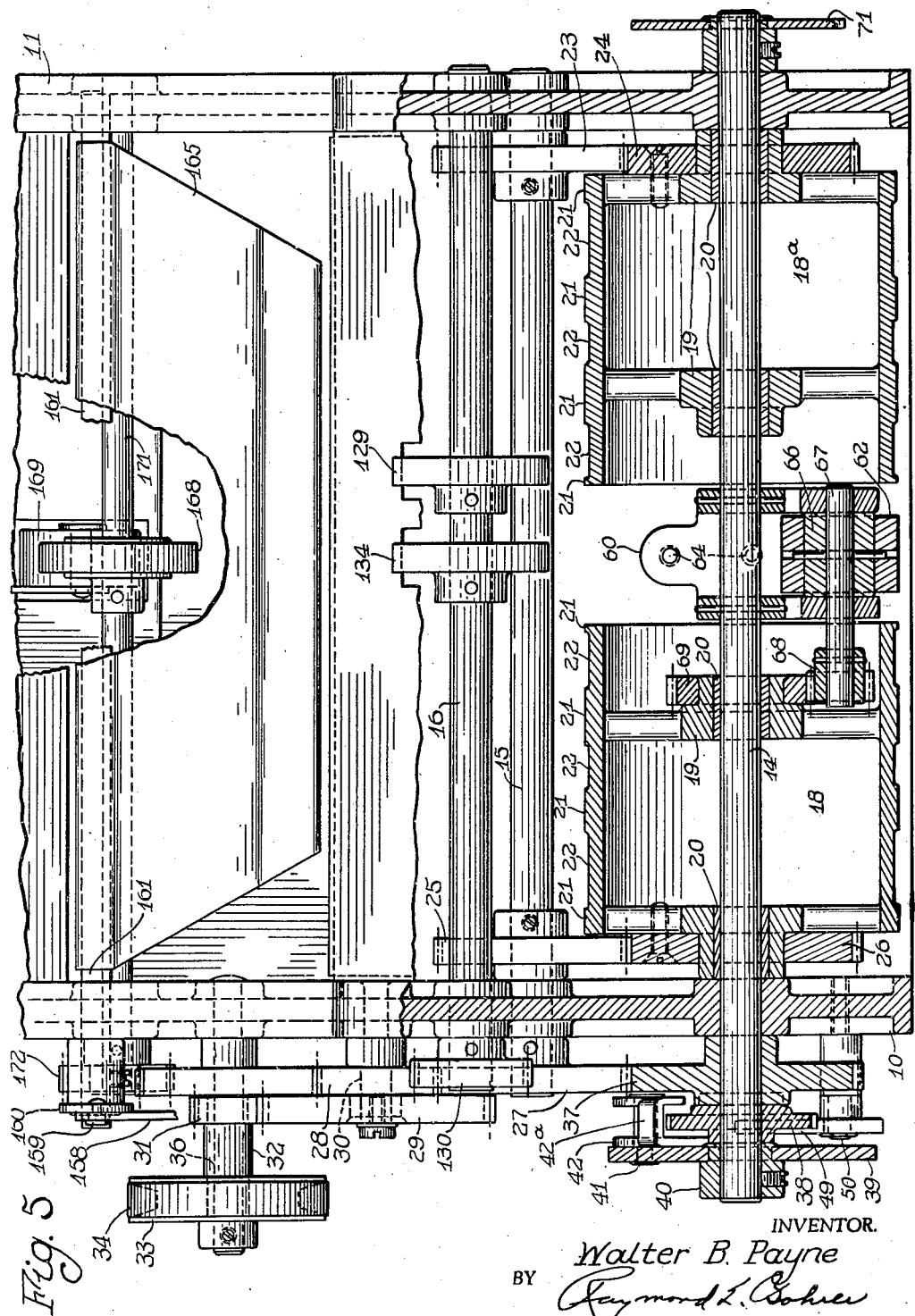
Fig. 5 is a fragmentary horizontal view taken substantially as indicated by the line 5—5 of Fig. 3 showing the cylindrical feed members, auxiliary feed roller means, and certain other parts in section.

Journaled for rotation about the axis provided by shaft 14 are spaced feed members preferably in the form of cylindrical devices or drums 18 and 18a, Figs. 1, 3, and 5. The hub portions 19 of the webs of the feed members are provided with suitable bushings 20. The feed means or members 18 and 18a are preferably provided with a plurality of longitudinal spaced annular sheet engaging feed band portions 21 spaced apart by the recesses 22. The spaced feed band surfaces 21 are preferably metal or other relatively hard material offering low frictional engagement with a sheet.

The cross shaft 15 carries a gear 23 which meshes with a gear 24 fixed to the feed member 18a as best seen in Fig. 5. A gear 25, also carried by the shaft 15, meshes with a gear 26 rigid on the side of the feed member 18. The shaft 15 extends beyond the frame 10 and a gear 27 is fixed thereto and has a driving connection with the power means. This driving connection consists of the intermediate pinion 28 rigid with the gear 29 both of which are mounted on a stud 30 carried by the hub 32 of the pulley 33. The pulley 33 is mounted upon the stud 36 carried by the side frame 10 and driven by the belt 34 connected to a motor suitably arranged and supported by the side frames of the device. It will now be seen that when the motor is energized, the feed cylinders 18 and 18a are constantly rotated through their gear connections with the pulley 33.

Figure 2:
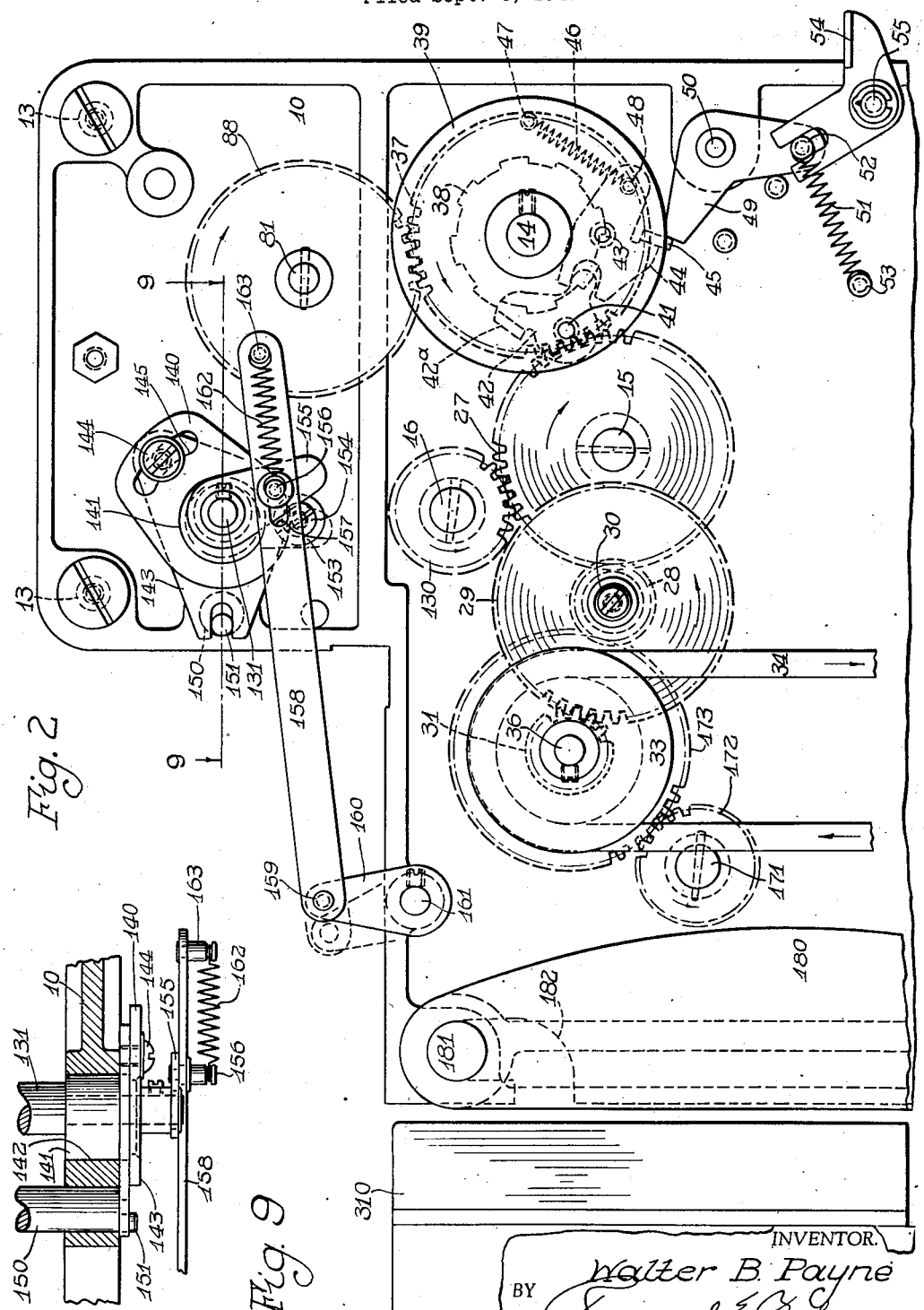
Fig. 2 is a side elevation as viewed from the left side of the mechanism shown in Fig. 1.

As best seen in Figs. 1, 2, and 5, the intermittently rotatable shaft 14 extends beyond the side frame 10 and a gear 37 is journaled thereon and meshes with the drive gear 27. A clutch means is associated with shaft 14 and includes a toothed ratchet member 38 rigid with the gear 37 and adapted to be continuously rotated with the shaft 15 by the gears 27 and 37. A clutch disc 39 is staked to a bushing 40 secured to the shaft 14 and carries a stud 41 upon which is pivoted a clutch dog 42 adapted to be released for engagement with the ratchet member 38, Figs. 2 and 5. The clutch disc 39 also carries a stud 43 which supports a clutch stop arm 44 operatively connected with the clutch dog 42. A spring 46 has one end connected to a stud 47 carried by the clutch disc 39 and the other end to a stud 48 carried by the trip dog 44. The spring 46 tends to rock the stop arm 44 about its pivot 44 in a counterclockwise direction as viewed in Fig. 2 to move the clutch dog 42 about its pivot 41 in a clockwise direction to move the formed portion 42a of the dog 42 into engagement with the teeth of the ratchet member 38. A clutch release dog 49 pivoted at 50 to the side frame 10 normally engages the ear 45 of the stop arm 44 to retain the clutch dog 42 out of engagement with the ratchet member 38. A spring 51 connected at one end to a stud 52 carried by the release dog 49 and at its other end to a stud 53 on the side frame 10 tends to constantly retain the release dog 49 in engagement with or in the path of the ear 45 of the stop dog 44. Therefore, it will be seen that the arm 49 normally retains the ear 42a of the clutch dog 42 out of engagement with the ratchet member 38 and selectively controls the rotation of the shaft 14. The trip arm 49 may be moved in a counterclockwise direction as seen in Fig. 2, to release the dog 44 by the manual trip lever 54 pivoted at 55 to the side frame 10 and operatively connected by the stud 52 with the release lever 49. Obviously, when the feeding device is associated with a machine or device into which the forms are to be fed, the release arm 49 may be automatically tripped as in the manner to be hereinafter described.

An auxiliary feed roller means is mounted on shaft 14 intermediate the feed members 18 and 18a, as shown in Figs. 1, 3, and 5. A supporting bracket 60 pinned to the shaft 14 carries a removable plate 61 upon which is mounted the resilient auxiliary friction feed roller 62. The support 60 and the plate 61 have a tongue and groove connection to align and prevent displacement of the parts when assembled. The bolts 64 serve to fasten the plate 61 rigid with the support 60. A counterweight 65 is formed on the bracket 60 to assure smooth operation of the shaft 14. The roller 62 of suitable frictional rubber material is mounted on a core 66 pinned to a stub shaft 67 carried by spaced arms of the mounting plate 61. A pinion 68 is fixed on the shaft 67 and meshes with a gear 69 fixed to the web of the feed member 18. It will now be seen that the rotation of the feed member 18 as previously explained will rotate the stub shaft 67 and the feed roller 62 mounted thereon.

Figure 12:
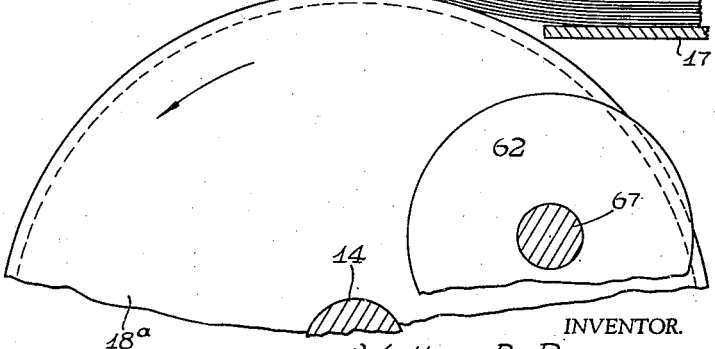
Fig. 12 is an enlarged diagrammatic view showing certain parts of the feed mechanism in substantially the position shown in Fig. 3, and in the position assumed prior to the engagement of the auxiliary friction feed roller with the bottom sheet of the stack located at feeding position on the supporting means.

In Figs. 3 and 12, the feed roller 62 is shown in the position assumed when the support 60 is in its normal position of rest and the shaft 14 is uncoupled from the drive means. In the operation of the device, the rotating feeding surfaces 21 of the feed members 18 and 18a engage and feed the lowermost sheet of a stack of sheets designated by the letter "A" and advance the sheets in a predetermined direction to a retarding roller means 70, as best seen in Fig. 12. As hereinafter described, the retarding roller means 70 resists the feeding of a sheet through the device by the feed members 18 and 18a. However, when the release lever 49 is actuated to connect the clutch so as to drive the shaft 14, the roller 62 is moved from the position shown in Figs. 3 and 12 to that generally indicated in Fig. 4, at which time the friction roller 62 engages the lowermost sheet of the stack and overcomes the resistance of the retarding rollers 70 so as to initiate the feed of a sheet in the predetermined direction of feed through the mechanism. Upon the continued rotation of the shaft 14, the clutch dog 42 will be disengaged from the ratchet member 38 by the arm 49 so that the shaft 14 will be uncoupled from the drive means and the support 60 carrying the friction roller 62 will again be retained in the position shown in Fig. 3 until a subsequent cycle of operation is initiated by tripping the release dog 49.

For continued efficient and positive operation of the feed mechanism, it is essential for different contact points or surfaces of auxiliary feed rollers to engage successive sheets as they are fed from the stack. Otherwise, the feed surface of the resilient roller 62 will rapidly become glazed, worn in spots, or otherwise defective in its feeding action. With the present arrangement, the roller 62 is rotated by gears 68 and 69 when its intermittently rotating support 60 is retained at its position of rest, that is, when shaft 14 is uncoupled from the drive means. Therefore, when the feed roller 62 is moved in engagement with a sheet of the stack by the rotation of shaft 14, a different contact point or surface of the roller will be positioned for engaging the sheet. The wear on the surface of the resilient roller will be automatically widely distributed. Obviously, the ratio between gears 25 and 26 and the gears 27 and 37 may be such to move the roller 62 with or relative to the peripheral speed of the feed members 18 and 18a when the support 60 is rotated with the feed members in the course of a feeding operation.

Figure 8:
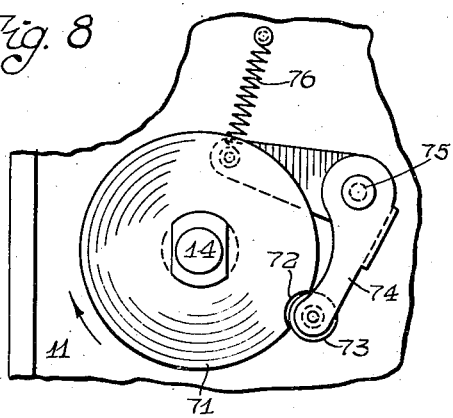
Fig. 8 is a fragmentary side elevation of the centering cam means arranged on the right side of the machine as viewed in Fig. 1.

As shown in Figs. 1, 5, and 8, a centering device is provided to maintain the shaft 14 and the parts associated therewith in the position of rest when the shaft is released from the drive means. This centering means is also effective to overcome any backlash of the shaft 14 likely to be caused by the sudden engagement of the clutch stop arm 44 with the trip arm 49. The shaft 14 projects beyond the side frame 11 and has a centering disc 71 fixed thereto. The disk 71 is provided with a suitable notch 72 adapted to be engaged by the roller 73 carried by the yoke arm 74 pivoted at 75 to the side frame 11. A spring 76 tends to restrain rotation of the disc 71 and the shaft 14 when the roller 73 engages the notch 72 of the disc.

Figure 6:
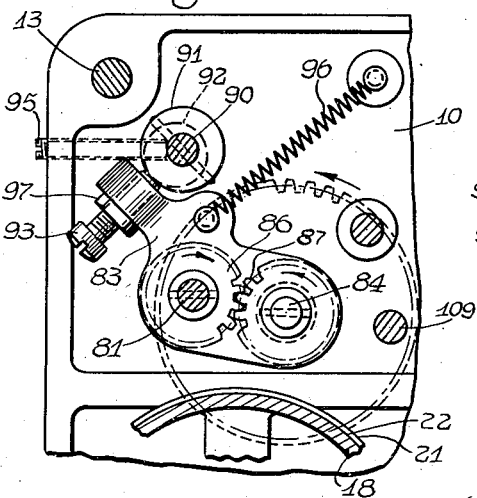
Fig. 6 is a fragmentary vertical sectional view taken substantially on the line 6—6 of Fig. 1 showing the driving gears and the adjustable supporting means for the sheet retarding roller shaft.

The retracting or retarding rollers 70 are of rubber or other friction material having cores 80 with hubs fixed to the shaft 81. These rollers are preferably positioned opposite certain of the annular recesses 22 provided between the feed surfaces 21 of the feed members 18 and 18a, as best seen in Fig. 1. The shaft 81 has its opposite end supported in adjustable brackets 82 and 83. The brackets 82 and 83 are similar in construction but the bracket 82 on the right side of the machine, Fig. 1, is pivoted on a stud 84a carried by the side frame 11. The bracket 83 on the left side of the machine is pivoted upon a stub shaft 84 supported by side frame 10, as seen in Figs. 1 and 6. A lock collar 85 secured to the shaft 81 adjacent the bracket 82 and a gear 86 pinned to the shaft 81 adjacent the bracket 83 prevent any lateral displacement of the shaft 81 with respect to its supporting brackets.

The gear 86 meshes with a gear 87 fixed on the stub shaft 84 supported by the side frame 10. The stub shaft 84 extends through the side frame 10 and has a gear 88 fixed thereon which meshes with the gear 37 journaled on the shaft 14. The gear 86 is constantly rotated by gears 87 and 88 driven by gear 37, and therefore continuously rotates the shaft 81 carrying the retracting or retarding rollers 70. As a result of the gearing arrangement, the peripheral surface of the rollers 70 will be rotated in a counterclockwise direction as viewed in Figs. 3 and 12, but in a clockwise direction as viewed in Figs. 4 and 6. The retrograde rotation of the rollers 70 engaging the edges of the sheets being fed through the machine serves to retard the advance of the sheets of the stack in the manner to be hereinafter described.

The retracting rollers 70 as previously explained are fixed to the constantly driven shaft 81 and arranged thereon opposite certain of the annular grooves 22 of the feed members 18 and 18a. The roller shaft 81 is preferably adjustable so that the space between the peripheral surface of the rollers 70 and a plane represented by the outside surface of the feed band 21 of the feed members 18 and 18a is preferably less than the thickness of a sheet. Therefore, while the rotating feed drums or members 18 and 18a normally tend to pass the sheet through the mechanism, the path of free travel of the sheet is interrupted because of the location of the rollers 70. It has been found that the retracting rollers 70 function best to retard the feed of the sheet when adjusted so that the relation between the rollers and the feed members 18 and 18a is such that a sheet buckles or bends slightly between the portions of the drum formed by the sheet engaging bands 21 as it passes through the mechanism.

The relation of the retarding rollers with the feed members 18 and 18a is one of the critical points of the feeder. Therefore, suitable adjusting means is necessitated for the supporting shaft 81 so as to provide adjustment for manufacturing inaccuracies, wear on the rollers 70, and different weights of paper. An adjustably rotatable cross rod 90, mounted in the side frames 10 and 11, has collars 91 fixed thereon, which are provided with eccentric portions 92 arranged to be engaged by the adjusting screws 93 carried by the supporting brackets 82 and 83 for retarding roller shaft 81. Suitable means is provided for selectively rotating rod 90 to adjust the eccentrics 92 in a predetermined position to position the shaft 81 and the rollers 70 mounted thereon with relation to the feed surfaces 21 of the feed drums 18 and 18a. A set screw 95 in the side frame 10 serves to retain the rod 90 in an adjusted position. As shown in Figs. 1 and 6, each spring 96 has one end carried by the brackets 82 or 83 and the other end by the frame 10 or 11 tends to retain the ends of the screws 93 in contact with the eccentrics 92. It will be seen that the eccentrics 92 provide a common adjustment for the shaft 81 so as to selectively vary the surfaces of the rollers 70 with relation to the feed surfaces 21 of the feed members 18 and 18a to provide for different thicknesses of paper or the other purposes mentioned.

Due to uneven wear or variations in the diameters of the retarding rollers 70, it is preferably desirable to provide means for adjusting opposite ends of the shaft 81 with relation to the feed surfaces 21 of the feed members 18 and 18a. In this way, the retarding rollers and the respective brackets 82 and 83 may be independently moved to and from the sheet engaging surfaces 21. The adjusting screws 93 threaded in the brackets 82 or 83 are provided with lock nuts 97, Fig. 6, and the ends of the screws are retained in engagement with eccentrics 92. Therefore, it will be clear that brackets 82 and 83 may be independently adjustable to vary the position of the retarding rollers on shaft 81 with relation to the feed surfaces 21 of the sheet feeding members 18 and 18a. It will be obvious that if a retarding roller 70 arranged on one side of the feed or pick-up roller 62 is positioned beyond the plane of the surface 21 of a member 18 or 18a, one side of the sheet would prematurely pass under the roller and start to feed diagonally through the feed mechanism. On the other hand, if a retarding roller 70 is positioned inside the plane of the feed surface 21 it would not permit a sheet to readily pass through the device when engaged by the auxiliary feed roller 62. In the latter instance the sheet would either be damaged or fed diagonal to the direction of feed.

Figure 4:
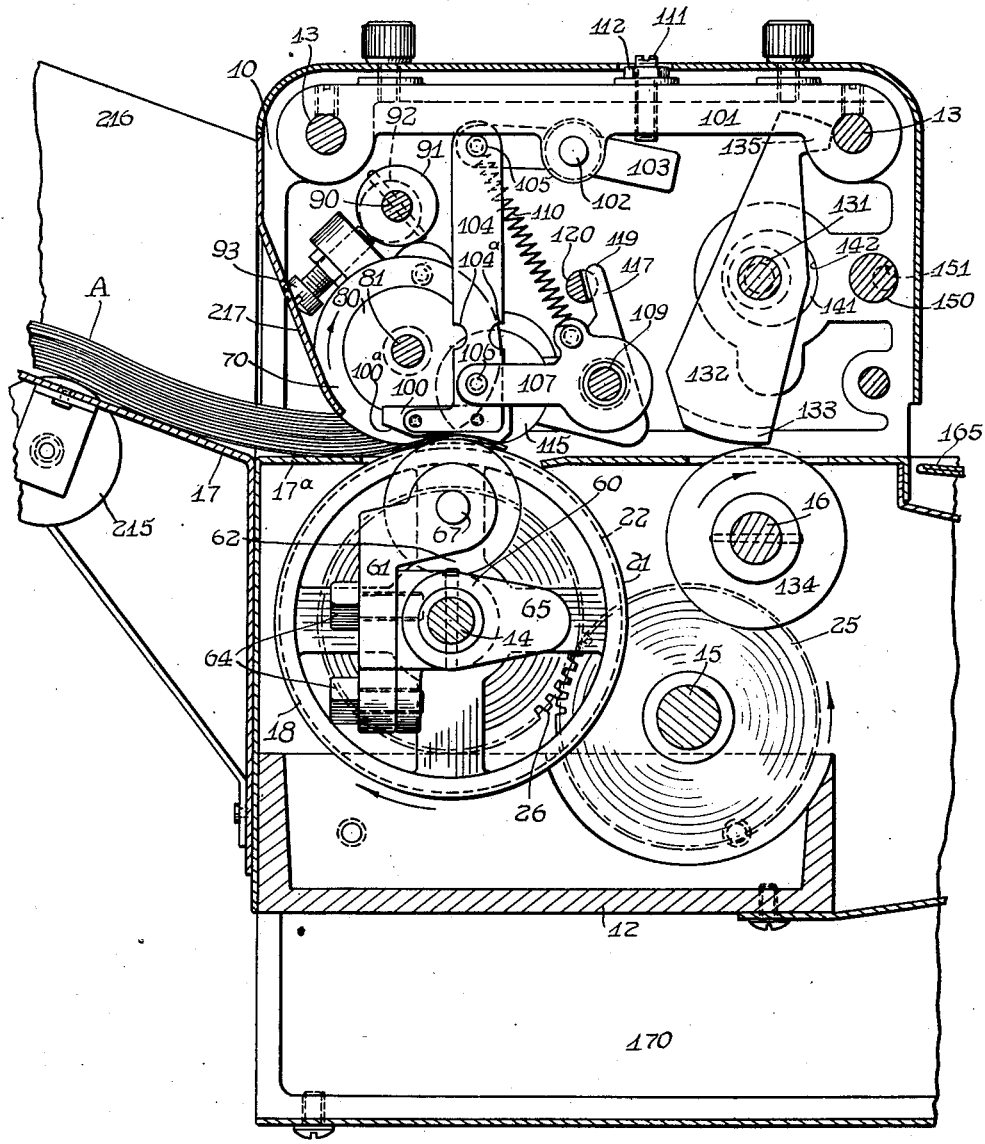
Fig. 4 is a vertical sectional view taken on a line 4—4 of Fig. 1 showing the auxiliary feed roller means operative to advance a sheet through the feed mechanisms.

To insure proper successive engagement of the auxiliary friction feed roller 62 with the sheets of the stack A, a pressure device such as the foot or shoe 100 is provided in the path of movement of the roller. As best seen in Figs. 3, 4, and 12, a supporting member 101 is mounted on the cross rods 13. A lever 103 pivoted intermediate its end on the rod 102 carried by the support 101 has a link 104 pivoted at 105 to each side thereof. The links 104 project downwardly and carry the foot or shoe 100. The lower ends of the links 104 are pivoted at 106 to the arms of a yoke member 107 carried by the cross rod 109 having its end mounted in the side frames 10 and 11. The springs 110, having one end carried by the stud 105 and the opposite ends to the arms of the yoke 107 yieldingly tend to rock the arm 103 and the yoke 107 about their pivots to move the links 104 and the shoe 100 downwardly in the path of the roller 62. An adjusting screw 111 threaded in the support 101 is adapted to engage the arm 103 for vertical adjustment of the shoe or pressure device 100 with relation to the path of the roller 62. A nut 112 serves to lock the screw 111 in an adjusted position to retain supporting means for the shoe 100 in a predetermined relation with the path of roller 62.

The pressure foot or shoe 100 is preferably of metal or relatively hard material offering relatively low frictional qualities. The pressure device 100 has its lower surface preferably curved with an arc substantially similar to the surface of the feed bands 21 of the feed members 18 and 18a. The front surface 100a is rearwardly and inwardly inclined so as to permit a group of sheets placed on the shelf 17 to taper toward the entering point of the feed mechanism. It will be seen that the arm 103 and the yoke 107 provides a parallel movement for the links 104 in the vertical adjustment and yielding action of the shoe 100. Therefore, the shoe 100 may yield against the tension of the springs 110 or be adjusted by the screw 111 without substantially altering the relative position of the shoe with relation to the engaging point of the roller 62. Notches 104a are formed in links 104 to provide weakened areas for adjustably bending the ends of the links 104, supporting the shoe 100, so as to adjust either end of the arcuate surface of the shoe to and from the path of movement of the feed roller 62. This latter adjustment provides for equalizing or varying the pressure afforded by different portions of the shoe as the roller 62 is in cooperative relation therewith.

Figure 7:
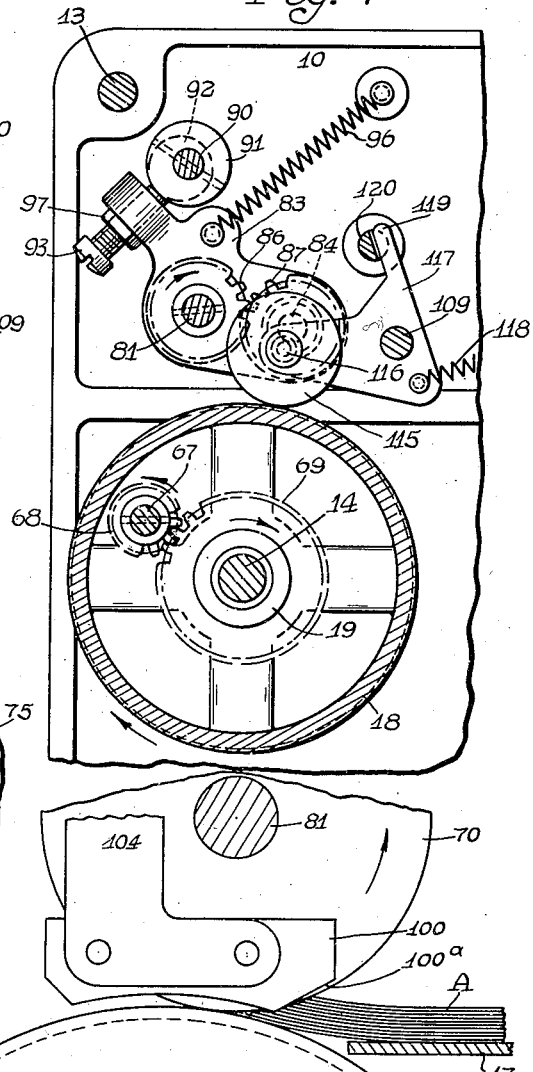
Fig. 7 is a fragmentary vertical sectional view taken on a line 7—7 of Fig. 1 showing the releasable take-away roller means in normal operative position, and a cylindrical feed member in section illustrating the relative position of the drive gears for the auxiliary feed roller.

As seen in Figs. 1, 4, and 7, take-away or pressure rollers 115 are held in yielding engagement with feed bands 21 of both drums 18 and 18a, and in the course of rotation serve to assist in the continued advance of the sheet through the feeding mechanism after it has been picked and fed from the stack by auxiliary roller 62. The rollers 115 are preferably of friction material and are freely mounted on studs 116 carried by the projecting end of arms 117. The arms 117 are pivotally supported on cross rod 109 and the springs 118 serve to normally retain the rollers 115 in engagement with the feed surfaces 21 of the feed drums. The arms 117 are provided with an extending finger portion 119 adapted to engage eccentric portions of a selectively rotatable rod 120 having its ends supported in the side frames 10 and 11. The rod 120 extends beyond the side frame 11 and is provided with a knob 94 which permits of adjustably rotating the shaft so as to rock the arms 117 about the pivot 109 to move the rollers 115 from engagement with the feed members 18 and 18a. In the operation of the machine, it may be expedient to release the rollers in the event a sheet becomes jammed or otherwise misplaced in the feeding operation.

A supplemental sheet advancing or feed means is provided to further assist in the advancement of a sheet through the feed mechanism or into an associated machine. This supplemental means includes a roller 125 pivoted at 126 to a supporting bracket 127 mounted on a cross rod 128 having its ends supported in the side frames 10 and 11. The spring 118 tends to also move the arm 127 in a clockwise direction, Fig. 3, to hold the roller 125 in engagement with a constantly rotating roller 129 mounted on the shaft 16 previously referred to. The shaft 116 projects beyond the side frame 10 and carries a gear 130 which meshes with the continuously rotating gear 27. Therefore, as a sheet is advanced by the feed mechanism after it has been picked and fed from the stack by auxiliary roller 62, the edge thereof enters between the rollers 125 and 129 to positively move the sheet in the predetermined direction of feed.

A calipering device is provided and adapted to be actuated in the event more than one sheet is fed by the feed mechanism. The calipering means is effective and operatively connected to a diverter 165, Figs. 3 and 5, which is adapted to be moved across the sheet path in the event two or more sheets are fed by the mechanism. The diverter serves to by-pass any such group of sheets that may be fed into a separate compartment, and thereby prohibits the feeding of more than one sheet at a time into an associated machine or device.

A rod 131 having its ends supported in the side frames 10 and 11 carries the calipering member 132. The calipering member 132 is normally in the position shown by full lines in Fig. 3, but adapted to be moved to the dotted line position shown in this same view when more than one sheet is advanced between shoe portion 133 and a roller 134. The roller 134 is pinned to the shaft 16 and adapted to be continuously rotated in a counterclockwise direction, Fig. 3, by the driving means through the gear 130. The upper portion 135 of the calipering member 132 normally engages one of the tie-rods 13.

The curved shoe portion 133 of the calipering member 132 is preferably arranged so that the bottom face thereof is spaced substantially the thickness of a sheet from the peripheral surface of the roller 134. It will be obvious that if a single sheet is fed by the feed means 62 the single thickness of paper will pass between the shoe 133 and the roller 134 without in any way affecting the calipering member 132. However, in the event any additional thickness, such as two or more sheets, is advanced, the additional thickness will cause the member 132 to be moved to the dotted line position as shown in Fig. 3 and thereby rock the rod 131.

Suitable adjusting means is provided at each end of the rod 131 to align the rod in parallel relation with the shaft 16 and to provide for a major adjustment of the calipering member 132 with relation to the continuously driven roller 134. The adjusting means for the ends of the rod 131 supported by side frames 10 and 11 are duplicated so that it will only be necessary to describe the means provided at one end of the rod. Referring to Figs. 1, 2, and 9, a plate 140 carries an eccentric bushing 141 engaging an opening 142 in the side frame 10. A secondary plate 143 arranged between side frame 10 and the plate 140 is mounted on the eccentric bushing 141. The plates 140 and 143 are adjustably fastened together by a screw 144 threaded in the plate 143 and passing through the slot 145 in the plate 140. A rod 150 supported by the side frame 10 and 11 is provided at each end with reduced portions 151 offset from the axis of the rod and engaging bifurcated projecting portions of plates 143. The rod 150 provides a fine or vernier adjustment for the eccentric bushing 141 and the shaft 131. A clamping device comprising blocks 153 is carried by screws 154 threaded in each side frame and serves to clamp the plates 140 and 143 in an adjusted position.

Wide variations in the thickness of sheets to be fed, or manufacturing inaccuracies, necessitate a rather wide range of adjustment of rod 131. A major adjustment of the rod 131 is accomplished by first loosening the screws 154 to unclamp the plates 140 and 143. One after the other, the screws 144 are then loosened to permit of adjustment of each plate 140 and the eccentrics 141 carried thereby. These major adjustments may be properly considered as the means to bring rod 131 in parallel relation with shaft 16 and the calipering member 132 within the range of the vernier adjustment accomplished by the eccentric action of the pins 151. After the eccentrics 141 have been adjusted by turning the plates 140 in a clockwise or counterclockwise direction, Fig. 2, to move the shaft 131 so as to approximate the space desired between the shoe portion 133 and the roller 134, the screws 144 are then tightened to fasten the plates 140 and 143 together. The exact spacing between the shoe 133 and the roller 134 for a sheet of a certain thickness is then obtained by rotating the rod 150 to move the eccentric pins 151 to move the plates 143. The fine or vernier adjustment permits of positioning the shoe so that the calipering means is effective and accurate to prohibit two or more sheets from being fed to the associated apparatus. It will be obvious that the eccentric rod 150 provides for adjusting the rod 131 in parallel relation with shaft 16 by simultaneously rotating both eccentrics 141 the same amount. This latter independent adjustment provides a convenient means in the use of the feeding mechanism to change and accurately adjust the caliper member 132 to accommodate sheets of varying thickness.

As previously explained, in the event two or more sheets are advanced from the stack by the feed means, the calipering member 132 is moved to rock the rod 131. The left hand end of the rod 131 as shown in Fig. 1, or as shown in Fig. 2 carries a crank arm 155 having a stud 156 which projects through an opening 157 of a link 158. One end of the link is supported by the stud 156 and the opposite end is pivoted at 159 to a crank arm 160 carried by reduced end of a cross rod 161 supported in the side frames 10 and 11. A spring 162 having one end carried by a stud 156 on the arm 155 and its opposite end by a stud 163 on the link 158 tends to move the link 158 to the left as shown in Fig. 2. When the calipering member 132 is in the normal position shown in Fig. 3, the arm 155 is retained in the position shown in Fig. 2 to retain the stud 156 in the end of the slot 157 and hold the link in the forward position against the tension of the spring 162. It will be obvious that when the shaft 131 is rocked in a clockwise direction due to the operation of the calipering member 132, the pin 156 will be moved so as to allow the link 158 and the rocker arm 160 to be moved from the full line position to the dotted line position as viewed in Fig. 2 to rock the rod 161 in a counterclockwise direction.

A sheet diverter 165 is suitably secured to the rectangular portion of the shaft 161 and moved from the full line position to the dotted line position illustrated in Fig. 3 of the drawings when the rod 161 is rocked by movement of the link 158. It will now be clear that when a single sheet is fed by the feed means and passed between the calipering member 132 and the roller 134 the sheet will pass over the diverter 165 and into the associated machine generally indicated in Fig. 3 by the reference numeral 310. However, in the event two or more sheets are fed by the feed means, the calipering means will be effected to move the rod 131 and shift the link 158 to rock the rod 161 and move the diverter 165 to intercept the path of travel of the group of sheets fed. This single group of sheets will then be directed in their path of movement into the by-pass channel 167. In order to insure the passage of sheets through the channel 167, pairs of rollers 168 and 169 are operative to advance the sheets so diverted into a suitable receptacle generally indicated by the reference numeral 170.

Each roller 168 is rigid with the shaft 171 rotatably supported by side frames 10 and 11 and projects beyond the frame 10 on the left side of the machine. A gear 172 is rigid on the shaft 171 and meshes with a gear 173 mounted on the stud 36 carried by the frame 10. The gear 173 fast to the pinion 31 is constantly driven by the pulley 33 to continually rotate the roller 168. Each roller 169 is carried by an arm 175 pivoted on a rod 176 and retained in engagement with the roller 168 by a spring 177. Any desired number of rollers 168 and 169 may be provided to advance the sheets into the receptacle 170.

Figure 10:
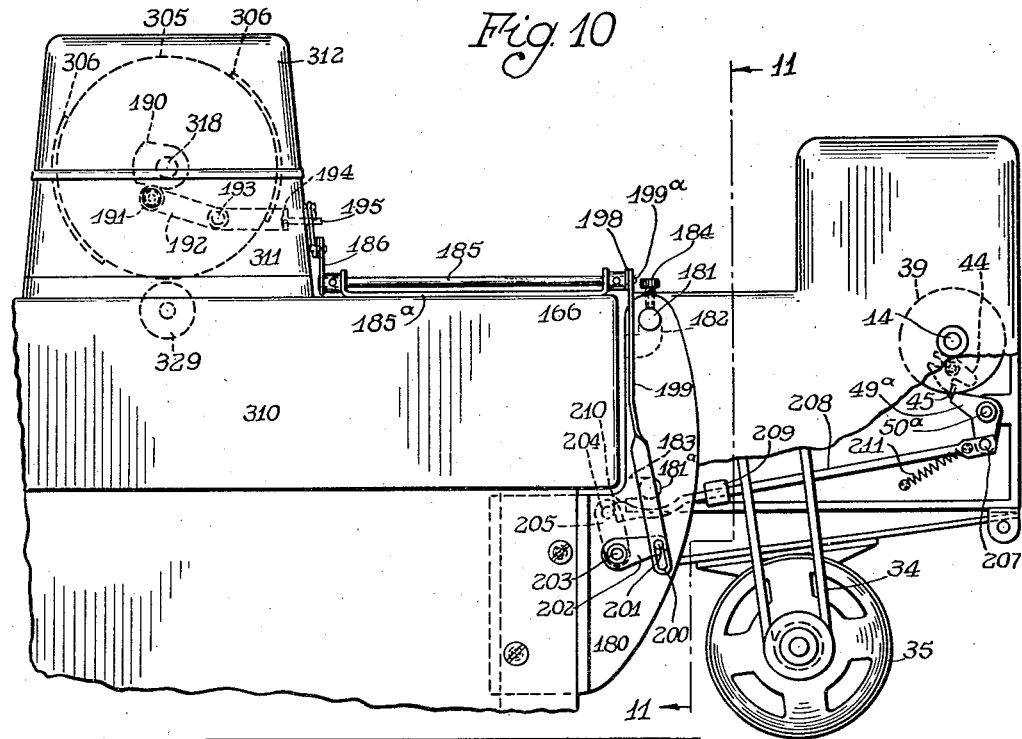
Fig. 10 is a rear elevational view of a conventional type of printing machine illustrating the association therewith of the feeding unit forming the subject matter of this invention.
Figure 11:
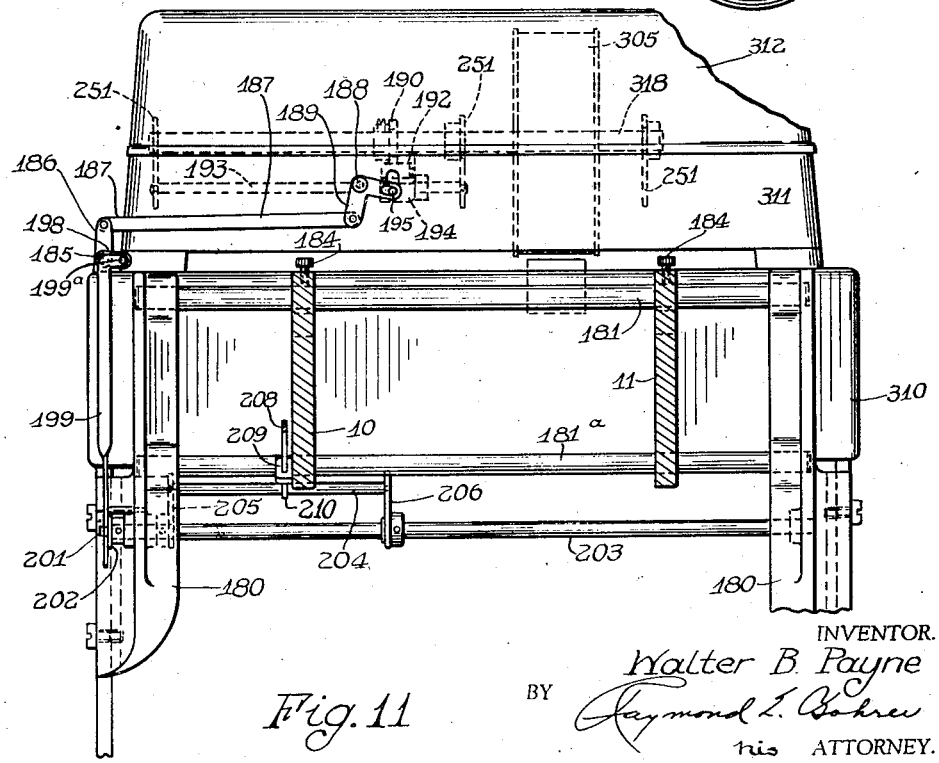
Fig. 11 is a fragmentary vertical sectional view taken substantially on the line 11—11 of Fig. 10 illustrating the supporting means and operating connections for the feeding device.

For illustrative purposes, but with no intent to unduly restrict or limit the scope or application of the invention it has been illustrated in Figs. 10 and 11 in association with an imprinting apparatus known commercially as a "Protectograph Signer—Model 31." An imprinting apparatus of this character is fully disclosed and described in my Patent No. 2,071,139, granted February 16, 1937, entitled "Printing apparatus." This machine is provided with a receiving guide having a continuously moving belt for advancing a sheet placed therein to printing position. Upon substantially reaching printing position in its advance, the sheet trips a clutch device to effect a printing cycle of operation. Referring to Figs. 10 and 11 the printing device illustrated includes a base 310 which supports an intermediate casing 311 and an upper casing 312. The casing of the machine suitably supports shaft 318 which carries a printing cylinder unit 305 upon which are mounted one or more printing plate holders 306. When the shaft 318 is connected with the suitable drive means through a clutch mechanism upon a sheet reaching printing position, the cylinder 305 is rotated to move the printing plate 306 into engagement with an impression roller 329. A further detail description of the structure and operation of this device is not deemed necessary as reference may be had to the aforesaid Patent No. 2,071,139.

Referring to Figs. 10 and 11, the brackets 180 are fastened to a suitable support for the base section 310 of the printing machine. The brackets 180 support cross rods 181 and 181a to which the side frames 10 and 11 of the feeding mechanism are detachably and adjustably connected. The upper portions of the side frames 10 and 11 are provided with the offset slots 182 for the reception of the supporting rod 181. The lower portions of the side frames 10 and 11 are provided with the slotted opening 183 for the reception of the lower supporting rod 181a. Upon mounting the feeding mechanism on the associated device, the slots 182 of the side frames are engaged with rod 181 and the frames are then rotated on the rod for the engagement of the slot 183 with the lower rod 181a. The feeding device is shiftable along the supporting rods to the desired position and locked in position by the set screws 184.

Suitable drive connection is provided for intermittently operating the sheet feeding unit so as to advance a sheet to the printing device in proper timed sequence. The printing cylinder shaft 318 adjustably supports a cam 190 arranged to engage a roller 191 carried by an arm 192 mounted on a rod 193 supported by auxiliary supporting plates 251 of the printing machine. The arm 192 is formed with an offset portion 194 provided with a pin 195 projecting through a slot in the machine casing portion 311. A bell crank lever 189 pivoted at 188 to the casing 311 is provided with the slotted end engaging the pin 195. A link 187 having one end connected to the bell crank lever 189 is connected to a crank arm 186 fast to a rod 185 carried by a bracket 185a supported by a base seciton 310 as seen in Fig. 10. The opposite end of the rod 185 carries an arm 198 to which a link 199 is connected at 199a. The lower end of the link 199 is formed with an elongated slot 200 for the reception of a pin 201 carried by a crank arm 202 fixed to a rod 203 supported by the brackets 180, Figs. 10 and 11. Intermediate the spaced brackets 180 is arranged a yoke member comprising the arms 205 and 206 supporting an actuating bar 204.

When the feeding mechanism is associated with a printing apparatus or similar machine as shown in Figs. 10 and 11, the manual trip for the clutch release arm 49 is substituted or combined with an operative connection with the printing device. In Fig. 10, the release arm 49a, normally engaging the ear 45 of the clutch stop arm 44 pivoted to the clutch disc 39, is connected at 207 to one end of an actuating member 208. The opposite end of the actuating member 208 is supported by a lug 209 formed on the side frame 10. The portion 210 of the actuating member 208 which extends beyond the support 209 is normally in the path of the actuating bar 204 of the yoke rocked by the shaft 203. A spring 211 tends to rock the release arm 49a in a clockwise direction as viewed in Fig. 10 to engage the stop arm 44 but permits of movement of the arm 49a to release the clutch mechanism so as to couple the shaft 14 with the drive means. Obviously, after passing the high point of the cam 190, the operative connection would permit the arm 49a to be effective to disconnect the shaft 14 from the drive means when the shaft completes a cycle of operation.

In the sequence of operation, a sheet upon entering the printing machine will actuate the clutch means of the signing machine in the manner set forth in my aforesaid patent. The shaft 318 is rotated in a counterclockwise direction as viewed in Fig. 10 so that the predetermined interval of the printing cycle, the cam 190 will actuate the lever 192 to move the pin 195 to rock the bell crank lever 189. The bell crank lever will pull on the link 187 to rock the rod 185 so as to shift the link 199 downward to move the rod 203 and the arms 205 and 206 which carry the actuating bar 204. Therefore, actuation of the rod 203 will move the bar 204 so as to shift the actuating member 208 to rock the clutch release dog 49a about its pivot 50a to release the clutch dog of the feed mechanism in the manner described. The feed mechanism will then be effective to advance a sheet into the printing device in proper timed sequence. It will therefore be seen that when the feeding device of the present invention is associated and operatively connected to an apparatus for printing or performing other operations on a sheet, the feeding device is adapted to successively feed the sheets into the associated apparatus. Furthermore, the feed mechanism is synchronized in such a manner that subsequent sheets are not fed until the printing device is in a predetermined part of a cycle of operation and adapted to receive another sheet.

The arrangement of the arms 205 and 206 supporting the rod 204 and adapted to move the actuating member 208 to trip the clutch provides an operating connection that is efficient regardless of the position to which the feeding unit is adjusted on the supporting rods 181 and 181a. Furthermore, it will be clear that the feeding device may be readily detached or attached without removing or disassembling any of the parts. The arrangement provides an extremely flexible combination and simple drive connection for a feeding mechanism adapted to be operated with an associated apparatus.

From the foregoing, the actuation of the sheet feeding mechanism comprising the present invention, as well as refinements made possible in the operation of a mechanism of this character, will be clear. A stack of sheets of paper or other articles to be intermittently fed are placed on the receiver or shelf 17. Rollers 215 suitably supported on the shelf 17 serve to hold the checks away from the shelf surface and thereby reduce the friction which may otherwise result from the engagement of the sheets with the entire surface of the shelf. Suitable adjustable side guide plates 216 may be provided in order to permit and assist the sheets of the stack to enter the feed point of the mechanism in the course of operation. Inasmuch as the main supporting surface of the shelf 17 is arranged at an angle and the sheet supporting surface 17a of the machine casing is arranged slightly below the upper portion of the feed members 18 and 18a, one side of the stack of sheets rests on the surface 21 of the feed members 18 and 18a. The continued counterclockwise rotation of the feed members 18 and 18a as viewed in Fig. 12 tends to constantly effect an advancing movement of the sheet in the direction of the feed. This action of the stack causes the sheets to be brought in engagement with the guide plate 217 formed from the removable cover portion of the machine and the bottom sheets thereof in contact with the retarding or retracting rollers 70. However, due to the location of the retarding rollers moving in a direction opposite to the normal path of travel of the sheets, the sheets are temporarily held from movement through the feed mechanism. The retrograde action of the rubber surface rollers 70 not only retards the advance of the sheet beyond a certain point, but because of their constant action upon the lowermost sheets, they also tend to fan or separate the sheets so that the edges are offset from one another. The fanned out formation of the lowermost sheets of the stack provides for the presentation of the bottom sheet somewhat ahead of the adjacent sheet. The wedge shaped or fanned out formation of the bottom sheet of the stack is maintained as the sheets are successively fed from the bottom of the stack by the feeding mechanism. The sheets are retained in feeding position until engaged by the intermittently actuated auxiliary feeding roller means 62 in the manner described.

When the shaft 14 is coupled with the drive means, the feed roller 62 is brought into cooperative engagement with the bottom sheet of the stack which is firmly pressed toward the roller by the pressure device or shoe 100. The metal surface of the shoe has a certain degree of smoothness, and the highly frictional contact with a sheet of the rubber roller 62 as contrasted with the low frictional grip of the metal shoe 100 enables the roller by sudden impact, to prevail over the contact of the shoe and initiate a forward feeding movement to the sheet which jerks or picks the bottom sheet from its position in the stack. The positive engagement and sudden jerking action of the auxiliary friction roller 62 with the bottom of the sheet of a stack overcomes the resistance placed thereon by the retrograde movement of the retarding rollers 70. In overcoming the frictional engagement of the rollers 70, the bottom sheet is moved between the latter rollers and the sheet engaging bands 21 of the feed members 18 and 18a. In passing through the mechanism at this point the sheet buckles or bends slightly between the portions 22 of the feed members formed by the sheet engaging bands 21. The retrograde action of the retracting rollers 70 and the resistance of the shoe 61 and the plate 217, upon the remaining lowermost sheets of the stack prevents their advancement through the feeding mechanism. In Fig. 4 the initial action of the intermittently moved friction rollers 62 on the lowermost sheet of the stack is disclosed. In this view the bottom sheet has been jerked over, drawn from the stack, and started on its way for advancement through the feeding mechanism by the impact of the roller 62 cooperating with the pressure shoe 100.

It will thus be seen that as the lower sheets of the stack approach the feeding point, they are first yieldingly advanced by the metal surface or bands 21 of the feed members 18 and 18a, while more strongly retarded by the frictional rubber surfaces of the retarding rollers 70, aided by the shoe 100 and the curved plate 217. These parts serve to operatively position the sheets with progressively advanced edges, so as to condition them for subsequent feeding actuation, without actually feeding them through the mechanism.

As the auxiliary rubber feed roller 62 impacts the bottom sheet, the conditions are in effect reversed in that the lower sheet is engaged with substantial pressure between the projecting roller 62 and the shoe 100. The highly frictional contact of the rubber roller prevails over the retarding effect of the smooth and metal surface of the shoe and the low pressure of the rollers 70 with the result that the rollers 62 project the lowermost sheets of the stack rapidly forward through the feed mechanism.

It will be noted that with the intermittent action of the roller 62 with relation to the feed drums 18 and 18a, the device is adapted to feed short as well as relatively long sheets. Once a sheet has been picked or jerked from a stack by the single action of the feed means 62 it is then advanced by the take-away roller 115 to the supplemental feed rollers 125 and 129 for continued advance through the feeding mechanism. The next sheet is not picked from the stack and started in its advance until the auxiliary feed means 62 is selectively or automatically actuated. This arrangement not only provides for the feeding of sheets larger than the circumference of the feed members 18 and 18a, but also provides a sheet feeding mechanism that may be automatically operated in timed sequence with an associated device or selectively actuated at desired intervals.

I claim:

1. In a sheet feeding apparatus, a support for a stack of sheets to be fed in successive order therefrom, rotatable feed means arranged to engage and feed the adjacent sheet of said stack in a predetermined direction, retarding means for yieldably resisting the passage of a sheet through said apparatus, auxiliary feed means intermittently movable with said feed means to engage said sheet, said auxiliary means projecting radially adjacent the periphery of said feed means for engagement with said sheet, means for rotating said feed means, and mechanism for intermittently moving said auxiliary means to engage said sheet and overcome the resistance of said retarding means to advance said sheet in said predetermined direction to initiate the feeding movement thereof.

2. In a sheet feeding apparatus, a support for a stack of sheets to be fed in successive order therefrom, continuously rotatable feed means arranged to engage and feed the adjacent sheet of said stack in a predetermined direction, auxiliary feed means intermittently rotatable relative to said feed means to engage said sheet, said auxiliary means projecting radially adjacent the periphery of said feed means for engagement with said sheet, means for continuously rotating said feed means, and mechanism for intermittently rotating said auxiliary means to move said sheet in said predetermined direction to initiate the feeding movement thereof.

3. In a sheet feeding apparatus, a support for a stack of sheets to be fed in successive order therefrom, a continuously rotatable feed member arranged to engage and feed the adjacent sheet of a stack in a predetermined direction, retarding means for yieldably resisting the passage of a sheet through said apparatus, an auxiliary feed means intermittently rotatable with said member for engagement with said sheet, means for continuously rotating said member, and mechanism for intermittently rotating said auxiliary feed means to engage said sheet and overcome the resistance of said retarding means and thereby effect the feeding of said sheet in said predetermined direction.

4. In a sheet feeding apparatus, a support for a stack of sheets to be fed in successive order therefrom, a continuously rotatable feed means arranged to engage and feed the adjacent sheet of a stack in a predetermined direction, retarding means for yieldably resisting the passage of a sheet through said apparatus, an auxiliary feed means intermittently rotatable with said feed means, said auxiliary means projecting radially adjacent the periphery of said feed means for engagement with said sheet, means for continuously rotating said feed means, mechanism for intermittently rotating said auxiliary means to engage said sheet and overcome the resistance of said retarding means and thereby effect the feeding of said sheet in said predetermined direction, and a pressure device adjacent the path of said auxiliary means for engaging the opposite side of a sheet to press the same into feeding contact therewith.

5. In a sheet feeding apparatus, a support for a stack of sheets to be fed in successive order therefrom, a pair of spaced continuously rotatable feed members arranged to engage and feed the adjacent sheet of a stack in a predetermined direction, retarding means for yieldably resisting the passage of a sheet through said apparatus, auxiliary feed means intermittently movable with said members, said auxiliary means positioned intermediate said feed member and projecting radially adjacent the periphery of said members for engagement with said sheet, means for continuously rotating said members, and mechanism operative at variably predetermined time intervals for intermittently moving said auxiliary means to engage said sheet and overcome the resistance of said retarding means and thereby effect the feeding of said sheet in said predetermined direction.

6. In a sheet feeding apparatus, a support for a stack of sheets to be fed in successive order therefrom, a pair of spaced continuously rotatable feed members arranged to engage and feed the adjacent sheet of a stack in a predetermined direction, retarding means for yieldably resisting the passage of a sheet through said apparatus, auxiliary feed means intermittently movable with said members, said auxiliary means positioned intermediate said feed members and projecting radially adjacent the periphery of said members for engagement with said sheet, means for continuously rotating said members, mechanism operative at variably predetermined time intervals for intermittently moving said auxiliary means to engage said sheet and overcome the resistance of said retarding means and thereby effect the feeding of said sheet in said predetermined direction, and a pressure device adjacent the path of said auxiliary means for engaging the opposite side of a sheet to press the same into feeding contact therewith.

7. In a sheet feeding apparatus, a support for a stack of sheets to be fed in successive order therefrom, continuously rotatable feed means arranged to engage and feed the adjacent sheet of a stack in a predetermined direction, retarding means for yieldably resisting the passage of a sheet through said apparatus, an auxiliary feed means intermittently movable with said feed means, said auxiliary means having its periphery projecting radially adjacent the periphery of said feed means for engagement with said sheet, drive means for continuously rotating said feed means, mechanism for intermittently moving said auxiliary feed means to engage said sheet and overcome the resistance of said retarding means and thereby effect the feeding of said sheet in said predetermined direction, said mechanism including a clutch means for connecting said mechanism to said drive means, and means operative at variably time intervals for actuating said clutch means to connect said mechanism to said drive means.

8. In a sheet feeding apparatus, a support for a stack of sheets to be fed in successive order therefrom, a continuously rotatable cylindrical feed means arranged to engage and feed the adjacent sheet of the stack in a predetermined direction, retarding means for yieldably resisting the passage of a sheet through said apparatus, an auxiliary feed roller intermittently movable relative to said feed means, said auxiliary roller having its periphery projecting radially adjacent the periphery of said feed means for engagement with said sheet, drive means for continuously rotating said feed means, mechanism for intermittently moving said feed roller to engage said sheet and overcome the resistance of said retarding means and thereby effect the feeding of said sheet in said predetermined direction, said mechanism including a clutch means for connecting said mechanism to said drive means, and selectively operable means for actuating said clutch means to connect said mechanism to said drive means.

9. In a sheet feeding apparatus, a receiver for a stack of sheets to be fed in successive order therefrom, continuously rotatable feed means arranged to engage and feed the adjacent sheet of a stack in a predetermined direction, retarding means arranged to engage a sheet and resist the feeding of same by said rotary feed means, a support intermittently movable with said feed means, an auxiliary feed roller carried by said support and having its periphery projecting radially adjacent the periphery of said feed means for engagement with said sheet, means for continuously rotating said feed means, and means for intermittently moving said support to move said auxiliary roller to engage said sheet and overcome the resistance of said retarding means and thereby effect the feeding of said sheet in said predetermined direction.

10. In a sheet feeding apparatus, a receiver for a stack of sheets to be fed in successive order therefrom, a continuously rotatable feed means arranged to engage and feed the adjacent sheet of a stack in a predetermined direction, retarding means arranged to engage the sheets and resist the feeding of same by said feed means, a support intermittently movable relative to said feed means, auxiliary feed means carried by said support and projecting radially adjacent the periphery of said feed means for engagement with said sheet, means for continually rotating said feed means, means for intermittently moving said support to move said auxiliary means to engage said sheet and overcome the resistance of said retarding means and thereby effect the feeding of said sheet in said predetermined direction, and a pressure device adjacent the path of said auxiliary means for engaging the opposite side of a sheet to press the same into feeding contact therewith.

11. In a sheet feeding apparatus, a receiver for a stack of sheets to be fed in successive order therefrom, continuously rotatable feed means arranged to engage and feed the adjacent sheet of a stack in a predetermined direction, retarding means arranged to engage the sheets and resist the feeding of same by said rotary feed means, intermittently movable support having a normal position of rest but movable with said feed means, an auxiliary feed roller carried by said support and having its periphery projecting radially adjacent the periphery of said feed means for engagement with said sheet, means for continuously rotating said feed means, mechanism operated by the rotation of said feed means for rotating said auxiliary feed roller relative to said feed means when said support is in said position of rest, and mechanism for intermittently rotating said support with said feed means to move said auxiliary roller to engage said sheet and overcome the resistance of said retarding means and thereby effect the feeding of said sheet in said predetermined direction.

12. In a sheet feeding apparatus, a receiver for a stack of sheets to be fed in successive order therefrom, continuously rotatable feed means arranged to engage and feed the adjacent sheet of a stack in a predetermined direction, retarding means arranged to engage the sheets and resist the feeding of same by said feed means, a support having a normal position of rest but rotatable relative to said feeding means, an auxiliary feed roller mounted on said support and having its periphery radially adjacent the periphery of said feed means for engagement with said sheet, means for continuously rotating said feed means, mechanism operated by the rotation of said feed means for rotating said roller at a different peripheral speed than said feed means, means for intermittently rotating said support relative to said feed means to move said auxiliary roller to engage said sheet and overcome the resistance of said retarding means and thereby effect the feeding of said sheet in said predetermined direction, and a pressure device adjacent the path of said auxiliary roller for engaging the opposite side of a sheet to press the same into feeding contact therewith.

13. In a sheet feeding apparatus, a receiver for a stack of sheets to be fed in successive order therefrom, an intermittently rotatable shaft, continuously rotatable cylindrical feed means mounted on said shaft arranged to engage and feed the adjacent sheet of the stack in a predetermined direction, retarding means arranged to engage the sheet and resist the feeding of same by said feed means, a support carried by said shaft for intermittent rotation with said feed means, an auxiliary feed roller mounted on said support and having its periphery projecting radially adjacent the periphery of said feed means for engagement with said sheet, drive means, said feed means being operatively connected to said drive means for continuous rotation thereby, mechanism for rotating said support including a clutch means for connecting said shaft with said drive means to intermittently move said auxiliary roller to engage said sheet and overcome the resistance of said retarding means and thereby effect the feeding of said sheet in said predetermined direction, and manual means for actuating said clutch means to connect said shaft with said drive means.

14. In a sheet feeding apparatus, a receiver for a stack of sheets to be fed in successive order therefrom, an intermittently rotatable shaft, a continuously rotatable cylindrical feed means mounted on said shaft and arranged to engage and feed the adjacent sheet of a stack in a predetermined direction, retarding means arranged to engage a sheet and resist the feeding of same by said feed means, a support fixed on said shaft, an auxiliary feed roller carried by said support and having its periphery projecting radially adjacent the periphery of said feed means for engagement with said sheet, a continuously operated drive means, said feed means being operatively connected to said drive means for continuous rotation therewith, mechanism operated by the rotation of said feed means for rotating said roller on said support relative to said feed means, mechanism for rotating said support at a different angular speed than said feed means including a clutch means for intermittently connecting said shaft with said drive means to move said auxiliary roller to engage said sheet and overcome the resistance of said retarding means and thereby effect the feed of said sheet in said predetermined direction, means for actuating said clutch mechanism, and a pressure device adjacent the path of said roller for engaging the opposite side of a sheet to press the same into feeding contact therewith.

15. In a sheet feeding apparatus, a receiver for a stack of sheets to be fed in successive order therefrom, an intermittent rotatable shaft, a continuously rotatable cylindrical feed means mounted on said shaft and arranged to engage and feed the adjacent sheet of the stack in a predetermined direction, retarding means arranged to engage the sheet and resist the feeding of same by said feed means, a support carried by said shaft having a normal position of rest but intermittently rotatable with said feed means, an auxiliary feed roller mounted on said support having its periphery projecting radially adjacent the periphery of said feed means for movement into engagement with said sheet, means for continuously rotating said feed means, mechanism operated by the rotation of said feed means for rotating said auxiliary roller on said support relative to said feed means, said mechanism including a gear associated with said feed roller and a gear carried by said feed means meshing with said feed roller gear, and means for intermittently rotating said shaft to move said support to engage said feed roller with said sheet and overcome the resistance of said retarding means and thereby effect the feeding of said sheet in said predetermined direction.

16. In a sheet feeding apparatus for engaging and feeding a sheet from a stack in successive order therefrom, the combination of a frame, of continuously rotatable feed means supported by said frame and having surfaces arranged to engage and feed the adjacent sheet of the stack in a predetermined direction, of retarding roller means rotatable in a direction to yieldably resist the passage of said sheet through said apparatus by said feed means, and an intermittently movable auxiliary feed means for engaging the sheet and overcoming the resistance of said retarding means to feed said sheet in said predetermined direction, said retarding means including a shaft, an adjustable support adjacent each end of said shaft pivotally supported by said frame, spaced frictional retarding rollers fixed to said shaft, means for independently adjusting said supports to adjust opposite ends of said retarding roller shaft with relation to the surfaces of said feed means, and means for simultaneously adjusting said supports with relation to said surfaces of said feed means.

17. In a sheet feeding apparatus, a support for a stack of sheets to be fed in successive order therefrom, a rotatable feed means arranged to engage and feed the adjacent sheet of a stack, retarding means for yieldably resisting the passage of a sheet through said apparatus, auxiliary feed roller means intermittently movable relative to said feed means to engage said sheet, means for rotating said feed means, mechanism for intermittently moving said auxiliary means to engage said sheet and overcome the resistance of said retarding means to initiate the feed movement thereof, a pressure shoe having an arcuate surface located adjacent the path of said auxiliary roller means for engaging the opposite side of said sheet to press the same into contact therewith, an adjustable supporting means for said pressure shoe, means for adjusting said supporting means to move said shoe to and from the path of said auxiliary roller means to accommodate varying thicknesses of paper, and means for adjusting said shoe to vary the position of its arcuate surface with relation to the path of travel of said auxiliary roller means so as to modify the extent of pressure applied to said sheet by different portions of said shoe.

18. In a unitary sheet feeding apparatus for engaging and feeding a sheet from a stack in successive order to the operating position of an associated mechanism, the combination of a frame supporting the sheet feeding apparatus, sheet feeding devices mounted in said frame including a continuously rotatable feed means arranged to engage and feed the adjacent sheet of a stack in a predetermined direction, retarding means for yieldably resisting the passage of a sheet through said apparatus by said feed means, auxiliary feed roller means intermittently movable relative to said feed means to engage the sheet and overcome the resistance of said retarding means to feed the sheet in said predetermined direction, driving means for continuously rotating said feed means, intercoupling means for intermittently connecting said auxiliary means with said drive means for movement through a single cycle of operation, and means actuated by a moving part of the associated mechanism for actuating said coupling means to initiate the operation of said auxiliary means in timed relation with the operation of such associated mechanism.

19. The combination with an apparatus for successively acting upon sheets of material, of a sheet feeding mechanism including a support for a stack of sheets to be fed in successive order therefrom, rotatable feed means arranged to engage and feed the adjacent sheet of said stack in a predetermined direction, retarding means for yieldably resisting the passage of a sheet through said feeding mechanism by said feed means, auxiliary feed means intermittently movable with said feed means to engage said sheet, said auxiliary means projecting radially adjacent the periphery of said feed means for engagement with said sheet, means for rotating said feed means, normally disconnected driving means for said auxiliary means, intermittently operative coupling means for interconnecting said auxiliary means with said drive means to move said auxiliary means to engage said sheet and overcome the resistance of said retarding means to initiate the advance of said sheet in said predetermined direction to the operating position of said apparatus, and an intermediate control means governed by the operation of said apparatus to actuate said coupling means to initiate the intermittent operation of said auxiliary means in timed sequence with said apparatus.

20. The combination with an apparatus for successively acting upon sheets of material which are intermittently fed to an operating position including intermittently operated means for operating said apparatus through a predetermined cycle, of a sheet feeding mechanism including a support for a stack of sheets to be fed in successive order therefrom, a continuously rotatable feed member arranged to engage and feed the adjacent sheet of a stack in a predetermined direction, retarding means for yieldably resisting the passage of a sheet through the feeding mechanism, an auxiliary feed means intermittently movable with said feed member to engage the sheet and overcome the resistance of said retarding means, means for continuously rotating said feed member, normally disconnected driving means for said auxiliary feed means, intermittently engageable coupling means for interconnecting said feed means with said drive means to move said feed means to engage and initiate the advance of the sheet in said predetermined direction to the operating position of said apparatus, and an intermediate control means governed by the operation of said apparatus to actuate said coupling means to initiate the intermittent operation of said auxiliary feed means.

21. In a sheet feeding apparatus, a support for a stack of sheets to be fed in successive order therefrom, continuously rotatable feed means arranged to engage and feed the bottom sheet of a stack in a predetermined direction, retarding means arranged to engage the lowermost sheet of the stack and resist the feeding of the same by said rotary feed means, continuously rotatable auxiliary feed roller intermittently movable relative to said feed means to engage the lowermost sheet, driving means for continuously rotating said feed means and said feed roller, and mechanism for intermittently moving said feed roller to engage said sheet and overcome the resistance of said retarding means and thereby effect the feeding of said sheet in said predetermined direction.

22. In a sheet feeding apparatus, a support for a stack of sheets to be fed in successive order therefrom, continuously rotatable feed means arranged to engage and feed a sheet of the stack in a predetermined direction, retarding means arranged to engage the sheet and resist the feeding of same by said rotary feed means, an auxiliary feeding couple including a continuously rotatable feed roller member and a pressure member for engaging the opposite side of a sheet to press the same into feeding contact with said roller member, driving means for continuously rotating said feed means and said feed roller member, and mechanism for intermittently moving one member of said feeding couple into cooperative engagement with the other member to engage said sheet and overcome the resistance of said retarding means and thereby effect feeding of said sheet in said predetermined direction.

WALTER B. PAYNE.